United States Patent [19]

Overfield

[11] 4,417,189
[45] Nov. 22, 1983

[54] CONTROL CIRCUIT FOR STEPPER MOTOR

[75] Inventor: Dennis O. Overfield, Fairfield, Conn.

[73] Assignee: The Perkin-Elmer Corporation, Norwalk, Conn.

[21] Appl. No.: 344,247

[22] Filed: Jan. 29, 1982

[51] Int. Cl.³ .............................................. G05B 19/40
[52] U.S. Cl. .................................... 318/696; 318/685
[58] Field of Search ................................ 318/696, 685

[56] References Cited

U.S. PATENT DOCUMENTS

| | | | |
|---|---|---|---|
| 3,919,608 | 11/1975 | Usami et al. ..................... | 318/696 X |
| 3,982,166 | 9/1976 | Sijtstra et al. ....................... | 318/696 |
| 4,142,140 | 2/1979 | Wiesner ................................ | 318/696 |
| 4,156,170 | 5/1979 | Strunc .................................. | 318/696 |
| 4,274,041 | 6/1981 | Mosel .................................. | 318/696 |
| 4,340,848 | 7/1982 | Hanagata et al. .................. | 318/696 |

Primary Examiner—B. Dobeck
Attorney, Agent, or Firm—E. T. Grimes; J. D. Crane

[57] ABSTRACT

A control circuit for a stepping motor includes a source of pulses at a first frequency which is applied to the stepping motor. In response to a gate signal, the circuit gradually increases the rate of pulses at the stepping motor. After reaching a predefined maximum pulse rate, the pulse remains at a constant rate for some time and then gradually decreases until reaching said first rate where it remains until another gate signal occurs. As such, the motor runs at one speed, accelerates to a second speed and remains there for a time and then decelerates to said one speed.

6 Claims, 5 Drawing Figures

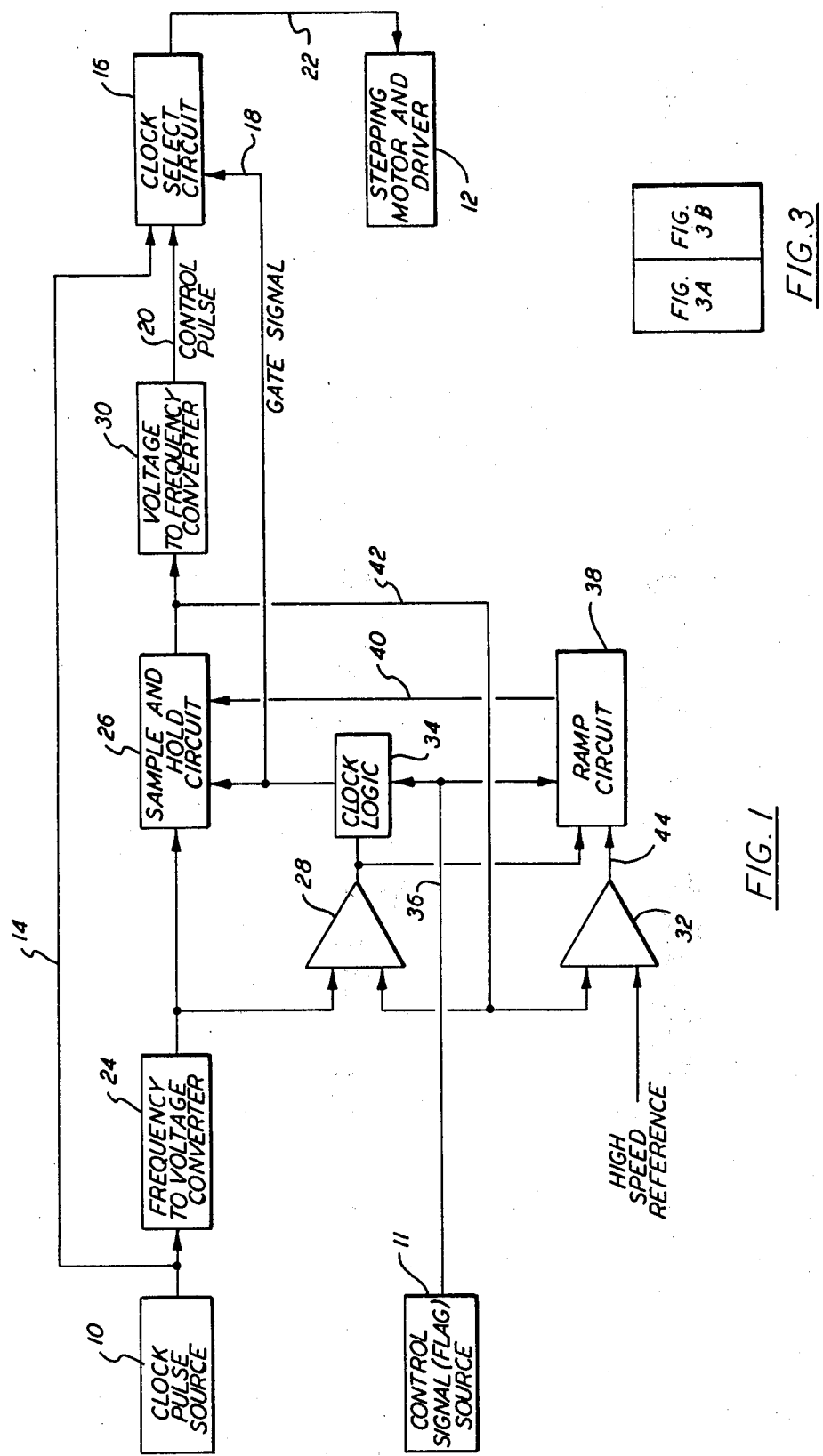

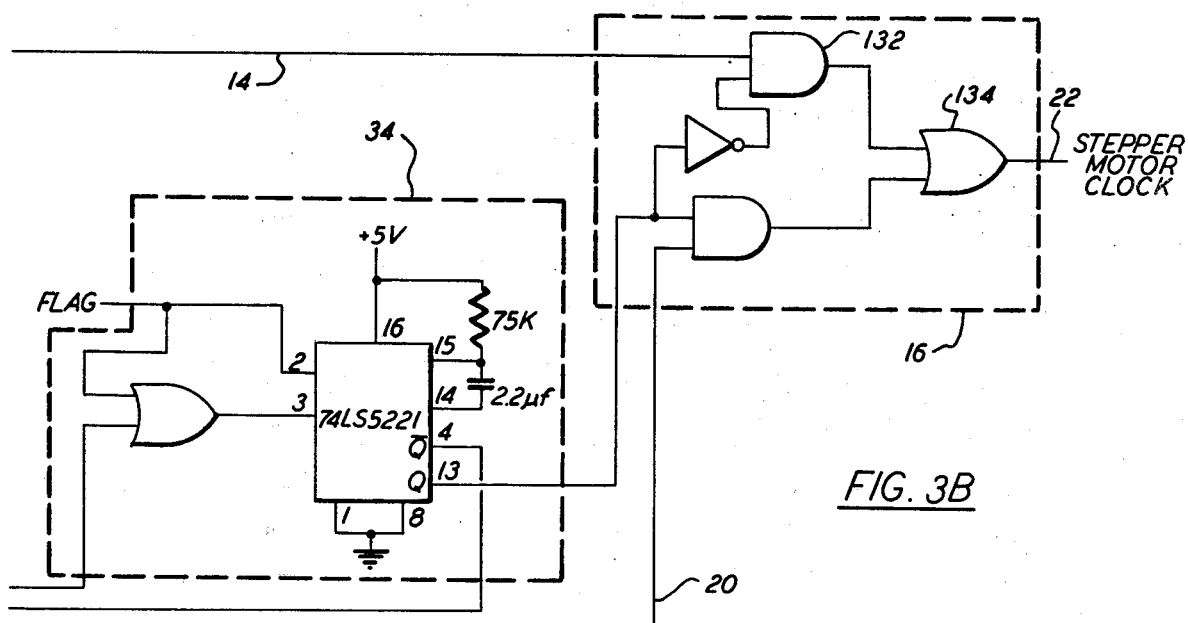
FIG. 3B
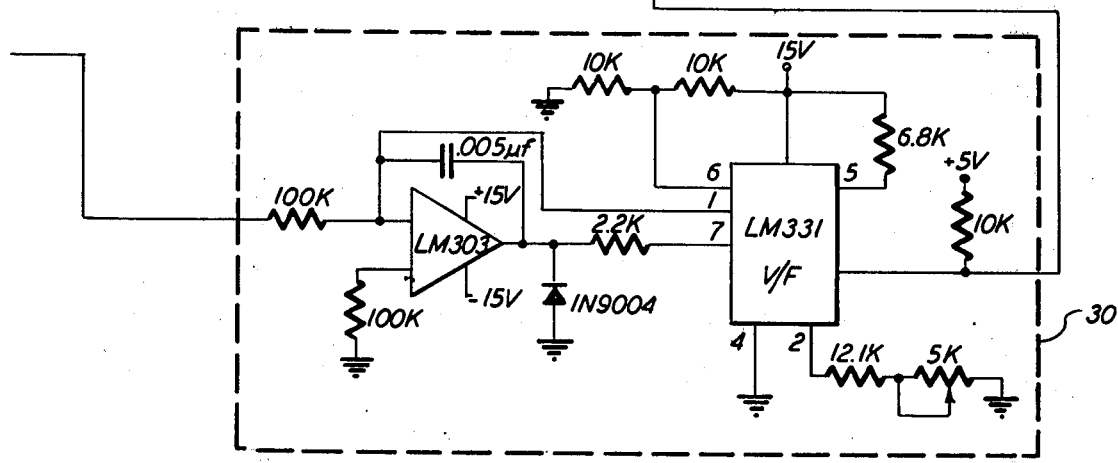
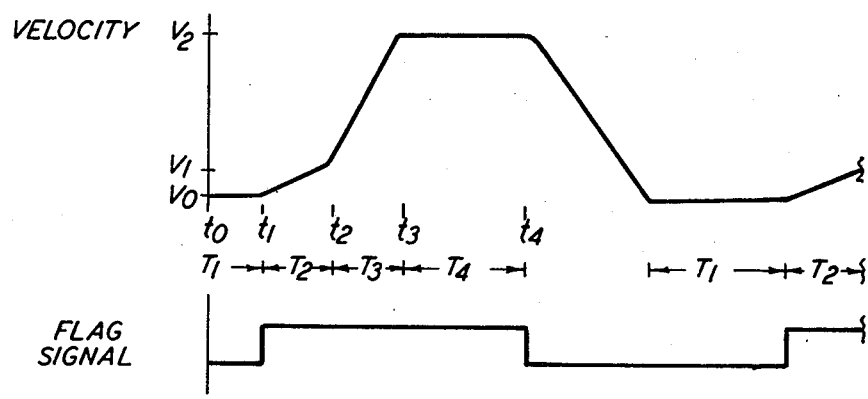
FIG. 2

CONTROL CIRCUIT FOR STEPPER MOTOR

This invention relates generally to the field of stepping motors and particularly to controlling a stepping motor used to power the pump of a liquid chromatograph.

In the field of liquid chromatographs, a pump is utilized in connection with pumping a liquid into the chromatograph column. Typically, a motor such as a dc motor, is coupled to the pump to drive it. For simple pumping arrangements, the requirements of the pump motor are easily satisfied. However, when the pump operation requires that the pump piston move at more than one rate during each pumping cycle, a dc motor can no longer be used.

Stepper motors, being responsive to pulses, can be made to operate at more than one rate if a suitable drive circuit can be designed. Conventional driver circuits, however, are primarily designed to drive stepper motor at a single rate, although the speed may be selected. Conventional designs are not suitable for changing the motor speed during each cycle of a piston pump.

As there is a need to provide a pump having at least two speeds for the piston during each pumping cycle, it is the primary objective of the present invention to provide a motor driver circuit which will drive a pump piston at one rate for much of the pumping cycle and at a second rate for the remainder of the cycle.

It is a further objective to provide a stepper motor control circuit which causes the motor to operate in a repeating cycle wherein the motor speed is at a first speed for most of the operating cycle and at a second speed for the remainder of the cycle.

BRIEF DESCRIPTION OF THE INVENTION

The circuit of the present invention utilizes a source of clock pulses which are gated by a clock select circuit to the stepping motor controlled thereby. The clock pulses are applied to the stepping motor for most of its operation. When the circuit detects a signal indicating that the motor should speed up, however, the clock select circuit disengages the clock pulses from the stepping motor and applies pulses at a varying frequency during acceleration and deceleration of the motor. When the motor is not accelerating or decelerating, the pulses are at a higher frequency than those of the clock pulses so the motor speed will be higher than when the clock pulses are applied to the motor.

DESCRIPTION OF THE DRAWINGS

The foregoing and other objects, advantages and features of the present invention are described below in connection with the drawings wherein:

FIG. 1 is a block diagram of the circuit according to the present invention;

FIG. 2 is a timing diagram for a portion of the circuit illustrated in FIG. 1;

FIG. 3 illustrates how FIGS. 3A and 3B fit together; and

FIG. 3A and 3B comprise a detailed schematic of the preferred embodiment according to the present invention.

DETAILED DESCRIPTION OF THE INVENTION

Figure 3A:
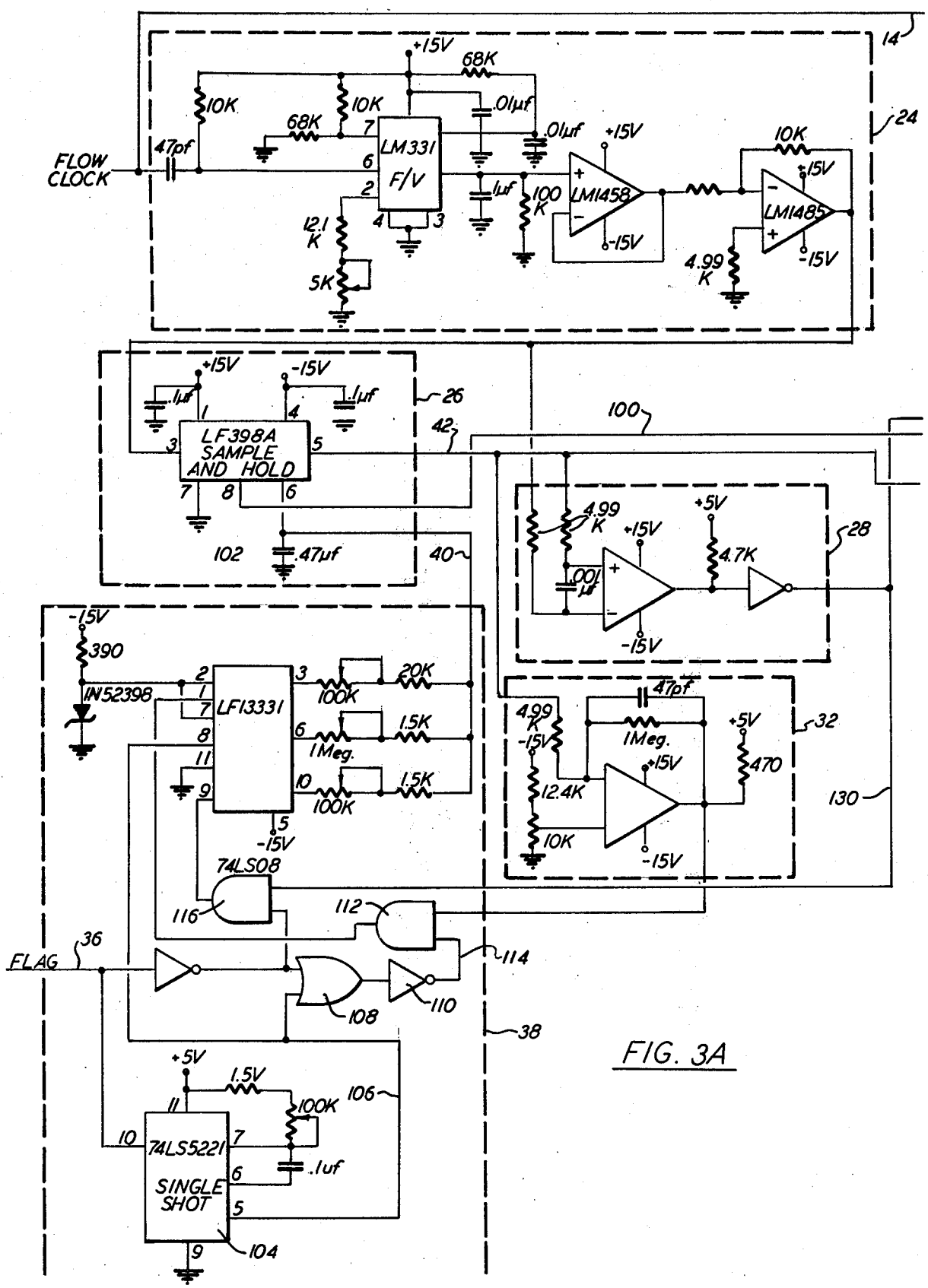

Referring first to FIG. 1, the system includes a clock pulse source 10 which may comprise an oscillator or any other suitable pulse source for producing pulses at a rate useful for driving a stepping motor driver and stepping motor 12, hereinafter simply referred to as stepping motor 12. The pulses are coupled from the output of the clock pulse source 10 via a line 14 to a clock select circuit 16 which is gated by signals on the gate line 18 so as to couple either the input line 14 or the input line 20 to the output 22 of the clock select circuit 16. The line 22 couples the clock pulses from the clock select circuit 16 to the stepping motor 12.

As previously indicated, the stepping motor 12, in accordance with the present invention, is operated most of the time at a speed which is controlled by the frequency of clock pulses developed by the clock pulse source 10. However, when it is desired to change the speed of the stepping motor 12, a signal is applied on the line 18 which causes the input line 20 to the clock select circuit 16 to be gated to the line 22 which couples to the stepping motor 12. When this occurs, the frequency of the pulses appearing on line 20 controls the speed of the stepping motor 12.

The change in the gate signal on line 18 is developed in response to a control or flag signal being produced by a speed control source 11. Any source of such a flag signal is likely to make the system, illustrated in the drawings, work. One such flag signal source is illustrated in a co-pending patent application Ser. No. 343805, filed 1/29/82, entitled "Control Circuit for Liquid Chromatograph" by Arnold Schwartz, which is incorporated herein by reference. A square wave oscillator or other digital oscillator could also be used as a flag pulse source.

As indicated above, it is an objective of the present invention to provide such a control circuit which will cause the stepping motor speed to change from one rate to another. It has also been found advantageous during the acceleration from one speed to another to accelerate first at a low rate and then at a higher rate until the maximum desired speed is reached. Thereafter, the speed remains at its maximum until said control signal initiates the deceleration to the original speed.

The timing diagram of FIG. 2 illustrates this wherein at time $t_0$ the speed of the stepping motor 12 is designated as $V_0$. At time $t_1$, the flag changes state causing the stepping motor speed to accelerate from speed $V_0$ to $V_1$. Then, in a manner described hereinafter, the rate of acceleration is changed by the circuitry causing the speed of the motor to accelerate faster between the time $t_2$ and the time $t_3$ when the stepping motor reaches its maximum speed $V_2$. The motor remains at the speed $V_2$ until the flag signal again changes state at time $t_4$. Thereafter, the stepping motor is decelerated until the velocity reaches the original speed $V_0$.

The circuitry for accomplishing the speed changing illustrated by the timing diagram in FIG. 2 is shown in block diagram form in FIG. 1. The circuitry includes a frequency-to-voltage converter 24 whose input is coupled directly to the clock pulse source 10 and whose output is coupled to a sample and hold circuit 26, as well as to a first comparator circuit 28. The output of the sample and hold circuit is coupled to a voltage-to-frequency converter 30 and also back to a second input on the comparator 28. The sample and hold circuit 26 output also couples to one input of a second comparator 32.

The circuit of FIG. 1 additionally includes a clock logic circuit 34 which is gated by the gate signal on the flag signal produced by source 11 and appearing on the line 36. In addition, the flag on line 36 couples to a ramp circuit 38. The ramp circuit 38 responds to the flag signal on line 36, as well as to the output of the second comparator 32. The ramp circuit 38 develops a signal on the line 40 which couples to the sample and hold circuit 26 and causes the voltage at the output thereof to change under control of the clock logic circuit 34.

The circuit of FIG. 1 functions in the following manner. When the stepping motor 12 is desired to be turned at its first speed $V_0$, the clock pulse source 10 is coupled via the line 14 to the clock select circuit 16, which is gated via line 18 to line 22 thereby applying the pulses from the clock source 10 to the stepping motor 12. When the motor 12 is to be accelerated, however, a signal appears on the flag line 36 indicating that the motor 12 is to be accelerated. The clocklogic 34 at this point causes the sample and hold circuit 26 to stop sampling the output of the frequency-to-voltage converter 24. The ramp circuit 38 is then actuated in a manner causing the output of the sample and hold circuit 26 to change at a first rate of change. This changing voltage at the output of the sample and hold circuit 26 is applied to the voltage-to-frequency converter 30 whose output on line 20 gradually increases in frequency as the voltage at its input increases. These increasing frequency pulses are gated by the clock logic 34 via the clock select circuit 16 to the line 22 which couples to the stepping motor. In this manner, the frequency of pulses received by the stepping motor 12 increases thereby causing the motor 12 to accelerate.

After a period of time, the clock logic 34 causes the ramp circuit 38 to change the rate of change of the voltage at the output of the sample and hold circuit 26. As previously indicated, this change occurs at time $t_2$ as illustrted in FIG. 2. When this occurs, the ramp circuit 38 causes the voltage at the output of the sample and hold circuit 26 to change more rapidly thereby causing the frequency-to-voltage converter 30 to produce a pulse train whose frequency is more rapidly changing than before. These more rapidly changing pulses are gated via the clock select circuit 16 and the line 22 to the stepping motor 12.

The output of the sample and hold circuit 26 is coupled by a line 42 back to the comparators 28 and 32. The other input to the comparator 32 is a high speed reference signal. When the voltage at the output of the sample and hold circuit 26 becomes equal to the high speed reference signal applied to the comparator 32, the comparator signals the ramp circuit 38 via the line 44 to stop changing the voltage at the output of the sample and hold circuit 26. This occurs at time $t_3$ as illustrated in FIG. 2. Thereafter, the voltage at the output of the sample and hold circuit 26 remains constant and, accordingly, the speed of the motor 12 will remain constant at a speed $V_2$.

When the signal on the flag line 36 changes state at $t_4$, as illustrated in FIG. 2, the ramp circuit 38 causes the voltage at the output of the sample and hold circuit 26 to start falling. When this occurs, the voltage-to-frequency converter 30 causes the frequency of pulses appearing on the line 20 to gradually decrease as the voltage at its input decreases. This in turn causes the stepping motor 22 to decelerate. When the voltage from the sample and hold circuit 26 as coupled via the line 42 to the comparator 28 equals the voltage at the output of the frequency-to-voltage converter 24, the comparator 28 causes a signal to be transferred to the clock logic circuit 34 which develops a gating signal on line 18 which causes the clock select circuit 16 to again couple line 14 to line 22. Accordingly, the stepping motor 12 is decelerated from its maximum speed $V_2$ to its lower constant speed $V_0$.

The block diagram of FIG. 1 is implemented by the circuitry shown in FIGS. 3A and 3B which fit together to form a composite schematic diagram in the manner illustrated by FIG. 3. In the schematic of FIG. 3A and 3B, numerous components are identified by their standard commercial designation for reader convenience; however, this should not be considered a limitation on the spirit or scope of the invention.

In the circuitry of FIG. 3A, the frequency-to-voltage converter 24 is illustrated in complete detail with the parameter value and circuit designations listed. The output of the frequency-to-voltage converter 24 couples to the comparator 28, as well as to the sample and hold circuit 26. The sample and hold circuit includes a sample and hold circuit module designated LF398A which is coupled via the line 100 to the clock logic circuit 34 of FIG. 3B. The line 100 has a high level signal on it except at times when the flag signal is high. Accordingly, the sample and hold circuit 26 is allowed to sample the output of the frequency-to-voltage converter 24 at all times except when the flag signal is high or when the level on line 130 is high which is true so long as the voltage at the output of the sample and hold circuit 26 is greater than the output of the frequency-to-voltage converter 24.

When the flag signal goes high, the voltage across the capacitor 102 and the sample and hold circuit 26 is no longer changed by signals appearing at input pin 3 of module LF398A but is affected solely by the ramp circuit 38. This ramp circuit 38 receives the flag signal on line 36 and immediately triggers a single shot circuit 104 causing the line 106 to become active. When this occurs, pin 7 of module LF13331 is connected to pin 6, thereby causing the voltage across the capacitor 102 to begin changing. The voltage on line 40 will change as a function of the resistors in series between the capacitor 102 and pin 7. Once the single shot 104 times out after five milliseconds, the signal on the line 106 changes state so that pin 7 is no longer connected to pin 6. However, the signal on the line 106 is transmitted by the OR gate 108 and the inverter 110 to an AND gate 112. The second input to this AND gate 112 comes from the comparator 32 and has an output which is high so long as the voltage appearing at the output of the sample and hold circuit 26 on line 42 is greater than the high speed reference voltage. Accordingly, the output of the AND gate 112 is high and this is coupled to pin 1 of module LF13331, which causes pin 3 to be coupled to pin 2. When this occurs, the resistance between the capacitor 102 and pin 2 is less than what is previously connected between the capacitor 102 and pin 7. Therefore, the charge on the capacitor 102 will change more quickly than it did previously. The voltage across the capacitor 102 will continue to change until the comparator 32 determines that the voltage on the line 42 is equal to the high speed reference voltage. When this occurs, the output from the comparator 28 changes state, thereby causing the AND gate 112 to place a low signal at its output, which causes the circuit LF13331 to disconnect pin 3 from pin 2. At this point, the remainder of the circuitry permits the development of a signal on pin 22 which is higher in frequency than it was previously, thereby causing the motor to run at a higher speed than previously.

Once the flag signal changes state, the signal on line 130 causes the sample and hold circuit 26 to maintain its output voltage except as changed by the ramp circuit 38. At the same time, the AND gate 112 has a low level signal on its input line 114, thereby continuing to maintain a low signal on pin 1 of LF13331. The AND gate 116, however, will produce a high level signal on pin 9, thereby causing pin 10 to be connected to pin 11. This causes the voltage across capacitor 102 to change at a rate controlled by the resistance value disposed between the capacitor 102 and ground via pins 10 and 11. As a result, the voltage on the line 42 begins to change in a direction causing the motor to slow down. Once the voltage at the output of the frequency-to-voltage converter 24 is the same as the output of the sample and hold circuit 26, the output of the comparator 28 on line 130 goes low. This causes the output pin 13 from the circuit 74LS5221 in the clock logic 34 to also go low. When this occurs, the signal on line 14 is coupled via the AND gate 132 to the input of OR gate 134. Since the output of gate 134 follows its input from gate 132, line 14 again becomes coupled to the line 22.

It will be observed throughout the drawings and the foregoing discussion that various circuit components has been assigned parameter values or standard commercial designations. This has been done purely for more clarity and reader convenience and is not intended as a limitation on component value or type nor as a restriction on the scope of the invention. Indeed, those of skill in the art will readily recognize that various circuit substitutions may be made for those shown in the drawings without departing from the spirit and scope of the invention, which is defined by the following claims.

What is claimed is:

1. A stepping motor control circuit comprising, in combination:
   a control signal source;
   a source of clock pulses at a first pulse rate;
   a voltage-to-frequency converter responsive to a voltage source for producing converter pulses at a rate controlled by said voltage source;
   selecting circuit responsive to said control signal for coupling either said clock pulse source or said converter pulses to the stepping motor in response to said control signal changing from one state to another;
   first control means, responsive to said control signal changing to the state where said converter pulses are gated to the stepping motor, for applying a gradually changing voltage to said voltage-to-frequency converter to cause the pulse frequency of the pulses produced thereby to start at the frequency of said clock pulses and rise gradually for a period of time $T_2$;
   second control means responsive to the ending of the time period $T_2$ to gradually change the voltage at the input to said voltage-to-frequency converter to cause the pulse rate produced by said voltage-to-frequency converter to rise gradually at a rate different from the rate of frequency change during time period $T_2$;
   third control means responsive to the voltage at the input to said voltage-to-frequency converter for maintaining said input voltage at a constant value once that value is reached, said input voltage remaining at said constant value until said control signal changes state;
   fourth control means responsive to said control signal changing state to gradually change the voltage at the input to said voltage-to-frequency converter so as to cause the pulse frequency produced thereby to change from that produced by said constant value voltage until the frequency is the same as produced by said clock pulse source; and
   fifth control means responsive to the pulse rate at the output of said voltage-to-frequency converter reaching that of said clock pulse source to actuate said selecting circuit to again apply said clock pulses to the stepping motor.

2. The circuit of claim 1 wherein said period of time $T_2$ is about 5 milliseconds.

3. The circuit of claim 1 wherein said fifth control means includes a frequency-to-voltage converter coupled to said source of clock pulses.

4. The circuit of claim 1 wherein said first, second, third and fourth control means include a common sample and hold circuit.

5. A stepping motor control circuit comprising, in combination:
   a clock pulse source for producing clock pulses at its output;
   a clock select circuit responsive to said clock pulses which are applied to one input thereto and to control pulses appearing at a second input thereto to couple either said clock pulses or said control pulses to its output, depending on the state of a gate signal applied thereto, the pulses appearing at the output of said clock select circuit being applied to the stepping motor for powering it;
   a frequency-to-voltage converter responsive to said clock pulse source to produce a voltage at its output which is directly correlated to the frequency of pulses appearing at its input from said clock pulse source;
   a sample and hold circuit responsive in part to the voltage appearing at the output of said frequency-to-voltage converter, said sample and hold circuit also being responsive to said gating signal to cause said sample and hold circuit to produce a voltage at its output representative of the voltage at its input from said frequency-to-voltage converter when said gating signal is in one state;
   a voltage-to-frequency converter coupled to the output of said sample and hold circuit to convert the voltage at the output of said sample and hold circuit to control pulses at a frequency correlated to the voltage at the output of said sample and hold circuit, said control pulses being applied to said second input to said clock select circuit;
   a clock logic circuit for producing said gate signal which is coupled to said sample and hold circuit and said clock select circuit, said gate signal being operative in one state to cause said sample and hold circuit to continually sample the voltage appearing at the output of said frequency-to-voltage converter while at the same time said clock select circuit is operative to gate said clock pulses from said clock source to said stepping motor, said clock logic circuit being operative to produce said gate signal in a second state which is operative to prevent sampling by said sample and hold circuit and to control said clock select circuit so as to gate said control pulses to said stepping motor, said clock logic circuit being responsive to a control signal source and a first comparator circuit;

said control signal source being operative to produce a signal at a first state for a period of time and at a second state for a different period of time;

said first comparator being responsive to the voltage appearing at the output of said frequency-to-voltage converter and also to the voltage appearing at the output of said sample and hold circuit, said first comparator producing a first clock logic control signal to indicate when the output of said frequency-to-voltage converter is equal to the output of said sample and hold circuit;

a ramp circuit responsive to said control signal source, said first comparator and a second comparator to produce signals coupled to said sample and hold circuit to cause the output thereof to gradually change at a rate and in a direction controlled by said ramp circuit;

said second comparator circuit being responsive to a reference input and the output of said sample and hold circuit to produce a second control signal which is applied to said ramp circuit to indicate when the output of said sample and hold circuit has reached the same level as said reference input;

said ramp circuit being responsive to said control signal changing to said second state to cause the output of said sample and hold circuit to gradually change at a first rate for a period of time $T_2$, said ramp circuit, after time $T_2$, causing the output of said sample and hold circuit to change at a second rate, the voltage at the output of said sample and hold circuit changing at said second rate until the output of said sample and hold circuit is equal to the value of said reference input causing the output of said sample and hold circuit to remain constant until said control signal source changes state, thereafter, said ramp circuit causing the output of said sample and hold circuit to again change at another rate and in a direction to cause the voltage at the output of said sample and hold circuit to gradually change so that the pulse frequency at the output of said voltage-to-frequency converter coupled thereto gradually changes in a direction approaching the pulse rate of said clock pulse source, said ramp circuit responding to said first comparator when it indicates the voltage at the output of said sample and hold circuit is equal to the voltage at the output of said frequency-to-voltage converter to cause the output of said sample and hold circuit to remain constant.

6. The circuit of claim 6 wherein said control signal source is operative to repeat its state changes from one state to another.

* * * * *